United States Patent
Lo et al.

(10) Patent No.: US 10,091,300 B2
(45) Date of Patent: Oct. 2, 2018

(54) WIRELESS MANAGEMENT AND COMMUNICATION NETWORK SYSTEM FOR MULTI-ZONES AND MANAGING METHOD FOR THE NETWORK SYSTEM

(71) Applicant: DELTA ELECTRONICS, INC., Taoyuan County (TW)

(72) Inventors: Tien-Szu Lo, Taoyuan County (TW); Meng-Seng Chen, Taoyuan County (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 301 days.

(21) Appl. No.: 14/848,549

(22) Filed: Sep. 9, 2015

(65) Prior Publication Data
US 2016/0088087 A1    Mar. 24, 2016

(30) Foreign Application Priority Data
Sep. 22, 2014 (TW) .............................. 103132678 A

(51) Int. Cl.
*G06F 15/173* (2006.01)
*H04L 29/08* (2006.01)
(Continued)

(52) U.S. Cl.
CPC .............. *H04L 67/12* (2013.01); *G05B 15/02* (2013.01); *G07C 9/00* (2013.01); *H04L 12/2827* (2013.01);
(Continued)

(58) Field of Classification Search
CPC ......... H04L 12/2827; H04L 2012/2841; H04L 41/12; H04L 12/2803
(Continued)

(56) References Cited

U.S. PATENT DOCUMENTS

| | | | |
|---|---|---|---|
| 5,361,985 | A | 11/1994 | Rein et al. |
| 2008/0298302 | A1* | 12/2008 | Ishida ................. H04L 12/2838 370/328 |

(Continued)

FOREIGN PATENT DOCUMENTS

| | | |
|---|---|---|
| CN | 101545897 | 9/2009 |
| CN | 101639695 | 2/2010 |

(Continued)

OTHER PUBLICATIONS

Office Action dated Apr. 27, 2016 from corresponding application No. TW 103132678.
(Continued)

*Primary Examiner* — Tauqir Hussain
(74) *Attorney, Agent, or Firm* — Hauptman Ham, LLP

(57) ABSTRACT

A network system in multi-zones comprises a plurality of smart nodes (SNs) and a plurality of zone controllers (ZCs). Each of the plurality of SNs is electrically connected with one of the plurality of ZCs respectively, and arranged in different zones of a building. Each of the plurality of ZCs is connected wirelessly with zone apparatuses in same arrangement zone through a self-organized network, so as to control the zone apparatuses and receive feedback information from the zone apparatuses of the arrangement zone. Each SN extracts the feedback information from the ZC connected thereto to execute analyses and calculations, so as to optimize the environment of the arrangement zone.

13 Claims, 14 Drawing Sheets

(51) Int. Cl.
*G05B 15/02* (2006.01)
*G07C 9/00* (2006.01)
*H04L 12/28* (2006.01)
*H04L 12/24* (2006.01)
*H04W 4/04* (2009.01)
*H04W 24/10* (2009.01)
*H04W 84/18* (2009.01)
*H04W 88/16* (2009.01)

(52) U.S. Cl.
CPC .......... *H04L 12/2838* (2013.01); *H04L 41/12* (2013.01); *H04W 4/043* (2013.01); *H04W 24/10* (2013.01); *G05B 2219/25187* (2013.01); *G05B 2219/2642* (2013.01); *H04L 2012/285* (2013.01); *H04L 2012/2841* (2013.01); *H04W 84/18* (2013.01); *H04W 88/16* (2013.01)

(58) Field of Classification Search
USPC ........................................................ 709/224
See application file for complete search history.

(56) References Cited

U.S. PATENT DOCUMENTS

| 2010/0012737 | A1 | 1/2010 | Kates |
| 2012/0041603 | A1 | 2/2012 | Wilmsen |
| 2014/0266669 | A1* | 9/2014 | Fadell ................. G05B 19/042 340/501 |
| 2015/0156254 | A1* | 6/2015 | Skaaksrud ............ H04W 12/06 709/223 |
| 2016/0088087 | A1* | 3/2016 | Lo ........................... H04L 41/12 709/224 |

FOREIGN PATENT DOCUMENTS

| CN | 101999252 | 3/2011 |
| CN | 103020739 | 4/2013 |
| CN | 103687076 | 3/2014 |
| JP | 2005157744 | 6/2005 |
| JP | 2011176482 | 9/2011 |
| TW | M430668 | 6/2012 |
| TW | M441805 | 11/2012 |

OTHER PUBLICATIONS

European Search Report dated Feb. 17, 2016 from corresponding application No. EP15185153.2.

Office Action dated Oct. 4, 2016 from corresponding application No. JP2015-186802.

Office Action dated Mar. 5, 2018 from corresponding application No. CN201410490817.1.

* cited by examiner

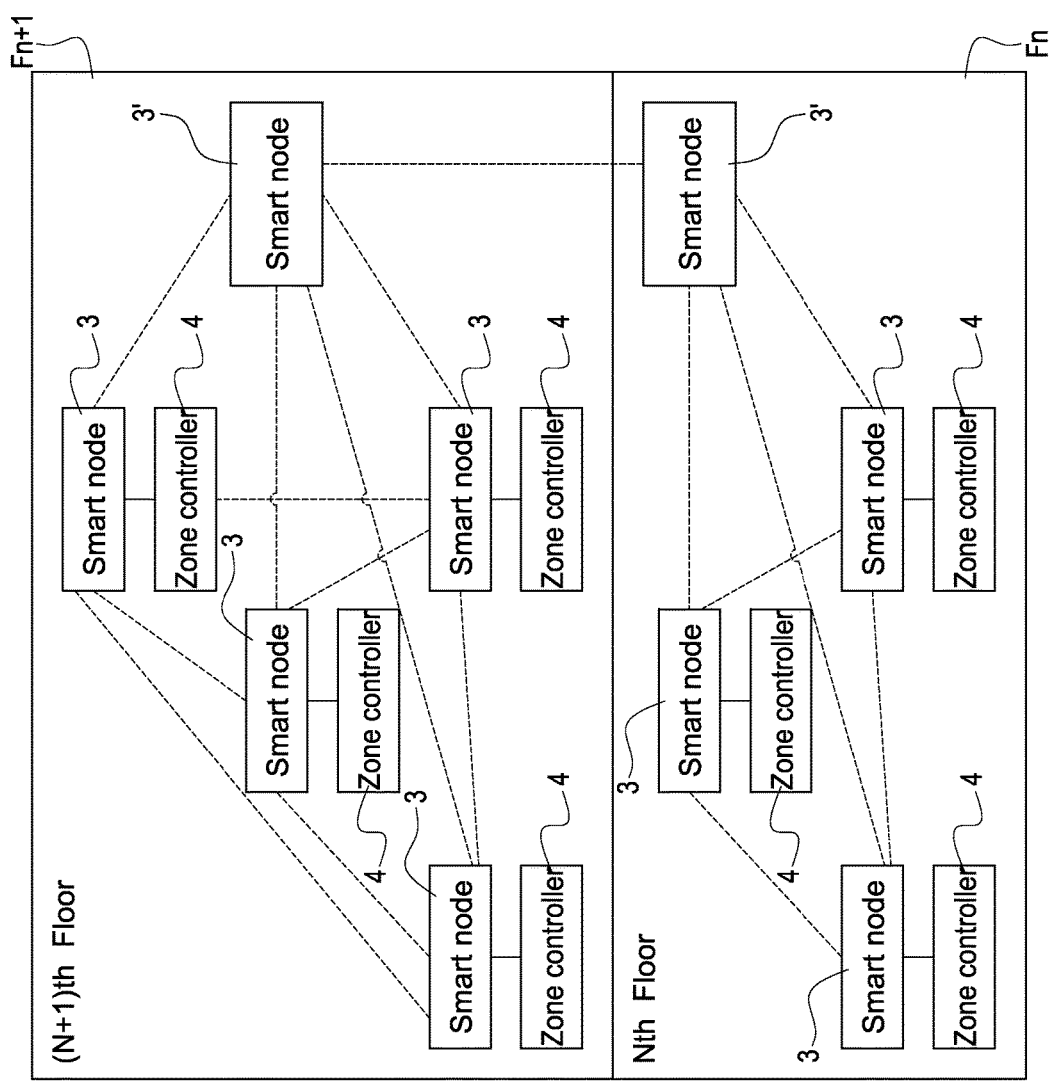

WIRELESS MANAGEMENT AND COMMUNICATION NETWORK SYSTEM FOR MULTI-ZONES AND MANAGING METHOD FOR THE NETWORK SYSTEM

BACKGROUND OF THE INVENTION

1. Field of the Invention

The invention relates to a network system, and in particularly to a network system for multi-zones in a building, and a management method used for the network system.

2. Description of Prior Art

For managing a building more efficient, the buildings nowadays are generally provided with a management system. For providing different functions, i.e. a fire fighting function, an air conditioner function, an access control function, a CCTV monitoring function, etc., the management system needs to install corresponding sub-systems for facilitating above functions. For integrating above sub-systems, the related-art management system mainly uses a central integrated platform to integrate the above sub-systems.

FIG. 1 is a schematic view of a related-art management system. As shown in FIG. 1, the related-art management system mainly comprises a fire fighting sub-system 11, an air conditioning sub-system 12, an access control sub-system 13 and an integrated platform, 2. The integrated platform 2 is a central server of a building, and the fire fighting sub-system 11, the air conditioning sub-system 12 and the access control sub-system 13 are operatively connected to the integrated platform 2.

Each of the sub-systems 11 to 13 in the management system works separately, stores individual information, and provides corresponding function respectively. When the sub-systems 11 to 13 need to transmit information to each other, they need to transmit the information to the integrated platform 2, and request the integrated platform 2 to integrate and process the received information. As mentioned, the related-art sub-systems 11 to 13 cannot communicate with each other directly through above communication manner. Furthermore, all information transmissions in the management system need to pass through the integrated platform 2, so the capacity of the information transmission is very huge in the management system.

In the related-art management system, even the sub-systems 11 to 13 are arranged in a same zone (such as a room or an office) or a same floor, i.e., they are contiguous with each other, the information transmissions still need to pass through the integrated platform 2.

As mentioned above, because a sub-system cannot transmit important information to other sub-system contiguous therewith, the related-art management system has sole function of monitoring or management for the whole building, it cannot help the building to accomplish optimized control for one or more zones of the building.

SUMMARY OF THE INVENTION

The object of the present invention is to provide a wireless management and communication network system for multi-zones, and a managing method for the network system. The present invention controls zone apparatus of multi-zones in a building, and executes analyses and necessary calculations based on the information extracted from the zone apparatus of each zone, so as to optimize the environment of each zone of the multi-zones in the building respectively.

The other object of the present invention is to provide the network system and the managing method for connecting a plurality of smart nodes (SNs) of different zones through a self-organized network, and transmitting information between the different zones through the plurality of SNs. Therefore, the present invention can optimize the environment of the multi-zones in the building simultaneously.

The another object of the present invention is to provide the network system and the managing method for using the SNs to indicate the equipment abilities of a plurality of equipment targets in each arrangement zone, so as to use the SNs to represent different area topology networks of different equipment targets.

According to the above objects, the network system in the present invention comprises a plurality of smart nodes (SNs) and a plurality of zone controllers (ZCs). Each of the plurality of SNs is electrically connected with one of the plurality of ZCs respectively, and arranged in different zones of a building. Each of the plurality of ZCs is connected wirelessly with zone apparatuses in same arrangement zone through a self-organized network, so as to control the zone apparatuses and receive feedback information from the zone apparatuses of the arrangement zone. Each SN extracts the feedback information from the ZC connected thereto to execute analyses and calculations, so as to optimize the environment of the arrangement zone. Further, the plurality of SNs communicates with each other through other self-organized network and transmits information between the plurality of SNs, so as to optimized the environment of the multi-zones simultaneously.

Comparing with prior art, the present invention controls the zone apparatuses of multi-zones through the ZCs, and executes analyses and calculations through the SNs based on the information extracted from the ZCs, therefore, the present invention can optimize the environment of each zone in the building respectively.

Besides, the present invention connects the plurality of SNs and transmits information between the SNs via the self-organized network, therefore, the present invention can consider all zones' situations in the building simultaneously, and execute an optimization for the environment of the multi-zones in the building simultaneously.

Furthermore, the present invention uses the SNs to indicate the equipment abilities of each arrangement zone (for example, the arrangement zone has a wind gap of a fan, or has a cooling sluice of a cooling pipe, etc.). Therefore, a plurality of area topology networks for different equipment targets can be represented by the SNs in the multi-zones, and topology network graphics can be generated by the SNs. As a result, the network system in the present invention can obtain the location information of the plurality of equipment targets through the generated topology network graphics, and execute a corresponding calculation to complete an intellectual control.

BRIEF DESCRIPTION OF THE DRAWINGS

FIG. 3A is a schematic view of a wireless management and communication system of a second embodiment according to the present invention.

DETAILED DESCRIPTION OF THE INVENTION

In cooperation with the attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
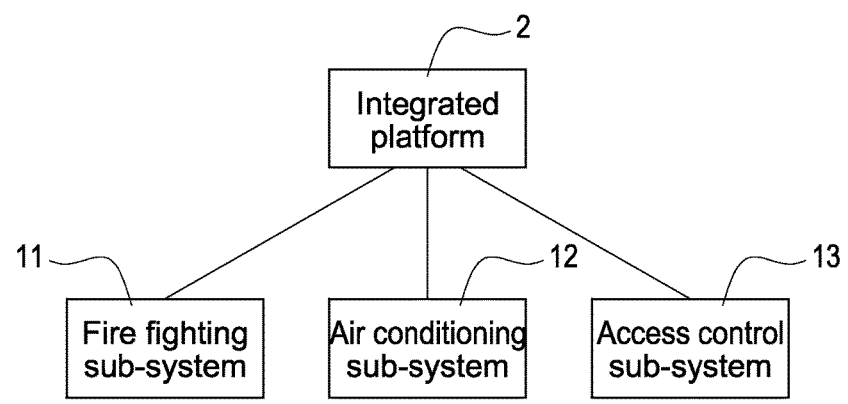
FIG. 1 is a schematic view of a related-art management system.
Figure 2:
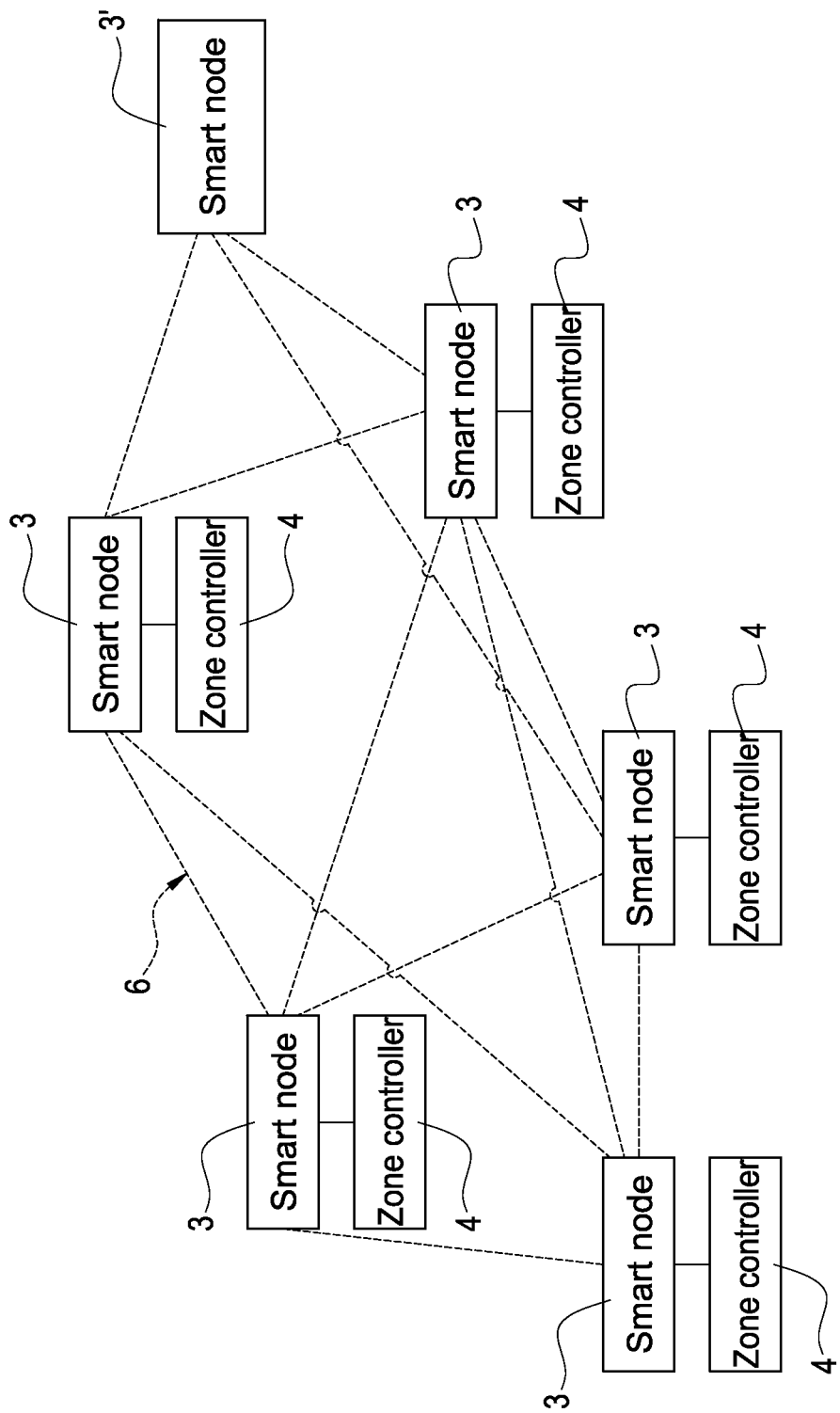
FIG. 2 is a schematic view of a wireless management and communication system of a first embodiment according to the present invention.

FIG. 2 is a schematic view of a wireless management and communication system of a first embodiment according to the present invention. FIG. 3A is a schematic view of a wireless management and communication system of a second embodiment according to the present invention. The present invention discloses a wireless management communication system for multi-zones (referred to as the system hereinafter), the system mainly comprises a plurality of smart nodes (SNs) 3 and a plurality of zone controllers (ZCs) 4. In the present invention, an amount of the plurality of SNs 3 is equal to an amount of the plurality of ZCs 4, and each of the plurality of SNs 3 is electrically connected to one of the plurality of ZCs 4 respectively. In particularly, the SN 3 can be electrically connected with the ZC 4, and the SN 3 and the ZC 4 can also be integrated together.

The system in the present invention is applied to a building (not shown), the building comprises multiple floors, and each floor comprises multiple zones. FIG. 2 shows an embodiment of multi-zones in a single floor, but not limited thereto. In this embodiment, each of the multi-zones is provided with one SN 3 and one ZC 4. The ZC 4 controls all zone apparatuses in the arrangement zone, and receives information from the zone apparatuses. The SN 3 extracts the information of the zone apparatuses from the ZC 4, and executes analyses and necessary calculations based on the extracted information. Therefore, the system uses the SNs 3 and the ZCs 4 to execute an optimized control for each zone respectively.

As shown in FIG. 2, the SNs 3 in different zones are connected with each other through a self-organized network. In particularly, the SNs 3 establish an inter-zone wireless communication network 6, and use the inter-zone wireless communication network 6 to connect together and to transmit information between the multi-zones.

In this embodiment, the inter-zone wireless communication network 6 can be accomplished by a wireless mesh network (WMN), for example, a Wi-Fi network capable of mesh function, but not intended to limit the scope of the present invention. Different floors in the building can establish different inter-zone wireless communication networks 6 respectively, and each of the plurality of SNs 3 inter-connect with other SNs 3 in different floors through one or more routing smart node 3'. Furthermore, if all of the SNs 3 in the building are equipped router function, then even two SNs 3 are arranged in different floors (i.e. the two SNs 3 connected to different inter-zone wireless communication networks 6), but the two SNs 3 can still connect with each other directly.

As in above description, at least one SN 3 in this embodiment is capable of the router function and used as the routing SN 3'. The routing SN 3' is used to connect multiple SNs 3 in different floors. In other words, the routing SN 3' is used to connect multiple inter-zone wireless communication networks 6, and transmit information between the multiple inter-zone wireless communication networks 6.

More specifically, the routing SN 3' is a destination node on a floor where the routing SN 3' is arranged. The routing SN 3' obtains and integrates information from multi-zones in the arrangement floor, and executes analyses and necessary calculations based on the information. Also, the routing SN 3' can further requests the SNs 3 of the multi-zones in the arrangement floor to execute specific actions, or inquiries other information from the SNs 3 of the multi-zones in the arrangement floor, based on the analyzing result or the calculating result. Therefore, the routing SN 3' can determine all situations of the multi-zones on the arrangement floor are under consideration, and execute an optimized control for the multi-zones of the arrangement floor simultaneously.

FIG. 3A shows an embodiment of a structure on multi-floors. As shown in FIG. 3A, the SNs 3 arranged on different floors can inter-connect and inter-communicate through one or more of the routering SN 3'. In this embodiment, a Nth floor Fn comprises three zones, and three SNs 3 in the three zones are integrated together by one routering SN 3' arranged in the Nth floor Fn. A (N+1) floor Fn+1 comprises four zones, and four SNs 3 in the four zones are integrated together by other routering SN 3' arranged in the (N+1) floor Fn+1. In this embodiment, the two routering SNs 3' connect with each other wirelessly for transmitting information between the two floors Fn and Fn+1.

As shown above, if the multiple SNs 3 connect to different inter-zone wireless communication networks 6 respectively, they can inter-connect to each other through one or more of the routering SNs 3'. However, if the SNs 3 and the routering SNs 3' cannot connect to other SNs 3 and 3' through the wireless network (for example, too far from each other, or the arrangement zone do not equip the wireless network), then the SNs 3 and 3' can further connect to other SNs 3 and 3' through a gateway.

Figure 3B:
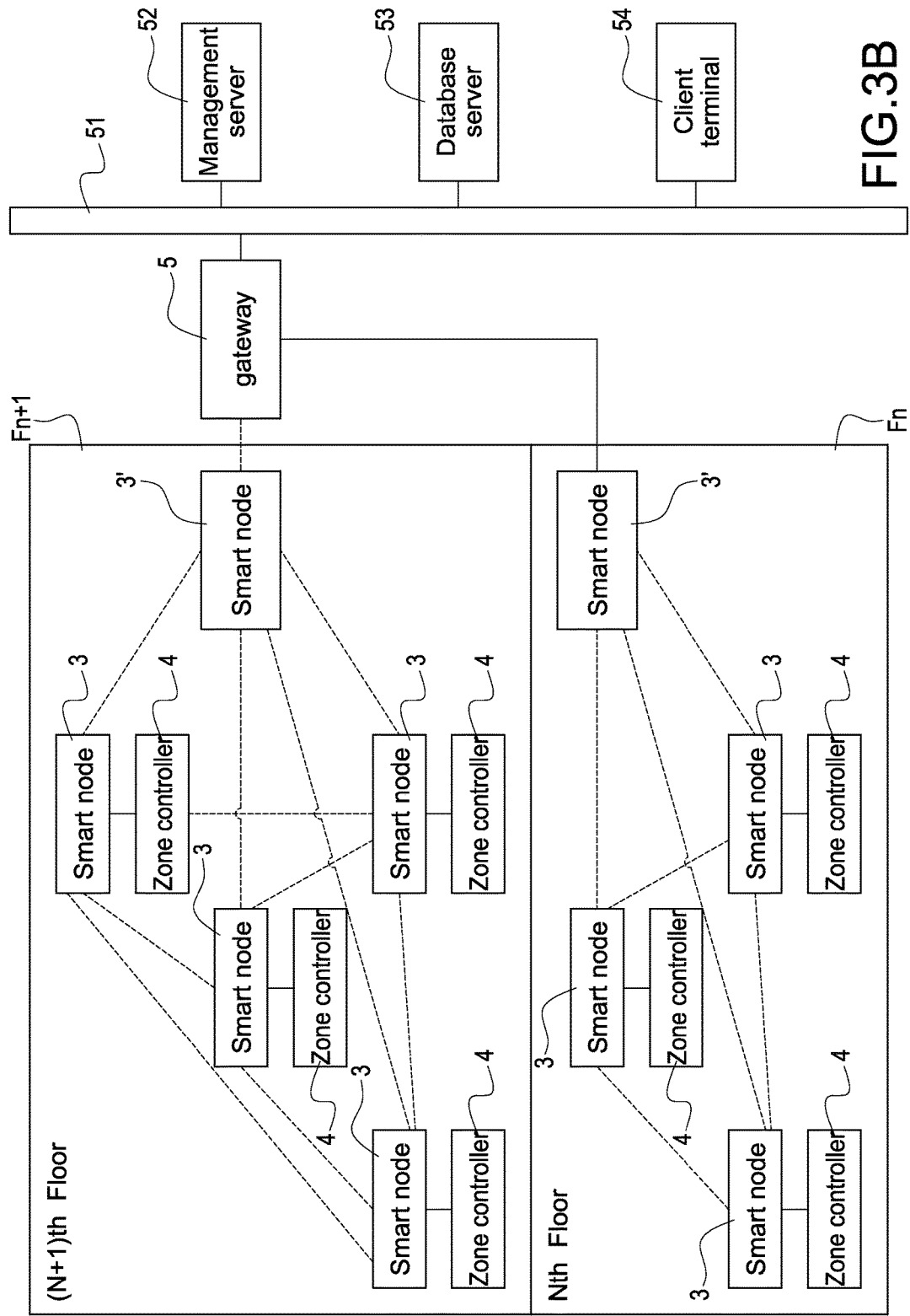
FIG. 3B is a schematic view of a wireless management and communication system of a third embodiment according to the present invention.

FIG. 3B is a schematic view of a wireless management and communication system of a third embodiment according to the present invention. As shown in FIG. 3B, the system can further comprises a gateway 5. In this embodiment, if the routering SN 3' in the Nth floor Fn cannot connect with the routering SN 3' in the (N+1)th floor Fn+1 through the wireless network, the routing SN 3' in the Nth floor Fn can firstly connect to the gateway 5 near to the (N+1)th floor Fn+1 through a cable, and further connect to the routing SN 3' in the (N+1)th floor Fn+1 through the gateway 5 (through a wireless or a wired manner).

Besides, the system in FIG. 3B can further comprises a bus 51, a management server 52 and a database server 53, wherein the gateway 5 is electrically connected to the bus 51, and further electrically connected with the management server 52 and the database server 53 through the bus 51.

The database server 53 stores information according to the multi-zones of the multiple floors. The database server 53 also stores basic data of the building, such as a floor planning chart, or planning charts related to fire fighting, water supply/drainage, power, air conditioner, etc. Furthermore, the database server 53 stores construction information according to the multiple floors of the building, and stores arrangement position information according to a plurality of hardware equipment (such as the SNs 3 and the ZCs 4) in the multiple floors.

The management server 52 extracts the above information from the database server 53, and uses the extracted information to analyze the states of the multi-zones of the multiple floors, such as power consumption states, temperature/humidity states, people entrance states, operating states of lights, etc. Based on the data collected and analyzed by the management server 52, the system in the present invention can easily execute data mining, so as to execute the optimized control for the environment of the whole building.

In this embodiment, the management server 52 can request and collect the information according to the multi-zones from the SNs 3 and/or 3', and execute the function as the same as that executed by the routing SN 3', i.e., execute the optimized control for the environment of the multi-zones in the different floors simultaneously. In other words, each of the plurality of SNs 3 in the present invention can execute the optimized control for the environment of a single zone, and the management server 52 and/or each of the plurality of routing SNs 3' in this embodiment can execute the optimized control for the environment of the multi-zones in the same/different floor(s) simultaneously.

Figure 4A:
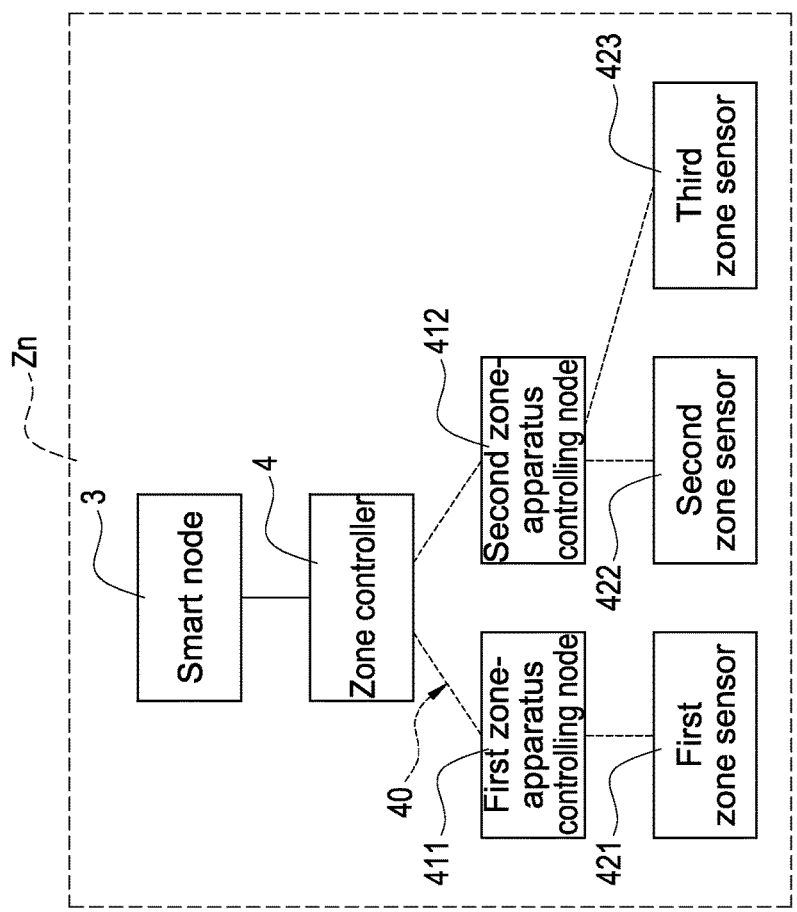
FIG. 4A is a schematic view of a specific zone of a first embodiment according to the present invention.

FIG. 4A is a schematic view of a specific zone of a first embodiment according to the present invention. As mentioned above, each of the multi-zones in the building is provided with one SN 3 and one ZC 4. FIG. 4A shows an embodiment according to a specific zone Zn, but not limited thereto.

The ZC 4 in the specific zone Zn establishes a self-organized network with at least one zone-apparatus controlling node and at least one zone sensor arranged in the specific zone Zn. The zone sensor senses environment parameters of the specific zone Zn, and the zone-apparatus controlling node controls corresponding zone apparatuses (such as lights, blinds, fans or air conditioner) in the specific zone Zn according to the environment parameters. In particularly, the ZC 4 establishes a local zone wireless sensing network 40 with the zone-apparatus controlling node and the zone sensor in the specific zone Zn. In this embodiment, the local zone wireless sensing network 40 can be accomplished by Zigbee or other wireless communication network with low power consumption, but not limited thereto.

In the embodiment of FIG. 4A, the ZC 4 connects with a first zone-apparatus controlling node 411 and a second zone-apparatus controlling node 412 wirelessly, the first zone-apparatus controlling node 411 connects with a first zone sensor 421 wirelessly, and the second zone-apparatus controlling node 412 connects with a second zone sensor 422 and a third zone sensor 423 wirelessly.

The first zone-apparatus controlling node 411 is electrically connected to a first zone apparatus (not shown), and is used as a control unit of the first zone apparatus (such as a lighting device). When the first zone sensor 421 (for example, a pyroelectric infrared (PIR) sensor) senses a person entering the specific zone Zn, it transmits an entrance information to the first zone-apparatus controlling node 411, so as to trigger the first zone-apparatus controlling node 411 to control the first zone apparatus to turn on. In the meantime, the SN 3 in the specific zone Zn can extract the entrance information and the controlling action executed by the first zone-apparatus controlling node 411 from the first zone-apparatus controlling node 411. The SN 3 in the specific zone Zn can then transmit the entrance information and the controlling action to other SNs 3 on the same floor to notify that a person enters to the specific zone Zn, and the first zone apparatus in the specific zone Zn is already turned on.

The second zone-apparatus controlling node 412 is electrically connected to a second zone apparatus (such as a fan coil unit (FCU) of an air conditioner system) and controls the second zone apparatus. When the second zone sensor 422 (for example, a temperature sensor) and/or the third zone sensor 423 (for example, a humidity sensor) sense(s) a temperature/humidity variation of the specific zone Zn, the second zone sensor 422 and/or the third zone sensor 423 transmit(s) an variation information to the second zone-apparatus controlling node 412, so as to trigger the second zone-apparatus controlling node 412 to control the second zone apparatus to adjust the temperature/humidity of the specific zone Zn. Also, the SN 3 in the specific zone Zn can extract the variation information and the controlling action executed by the second zone-apparatus controlling node 412 from the second zone-apparatus controlling node 412.

As mentioned above, the SN 3 can extract the information sensed by the zone sensor of the specific zone Zn, and extract the controlling action executed by the zone-apparatus controlling node of the specific zone Zn. As a result, the SN 3 in the specific zone Zn can execute analyses and necessary calculations based on the extracted information and controlling action, so as to execute the optimized control for the environment of the specific zone Zn.

For an instance, the SN 3 can calculate an amount of person in the specific zone Zn through a PIR sensor, obtain the temperature of the specific zone Zn through a temperature sensor, obtain the humidity of the specific zone Zn through a humidity sensor, etc. Therefore, the SN 3 can further calculate a heat value generated per second in the specific zone Zn. Also, the SN 3 can calculate an amount of cooling water (per second) provided by a colling pipe of the air conditioner system and flowing through the specific zone Zn, which can dissipate the generated heat effectively. By way of the calculation of the SN 3, the environment comfort of the specific zone Zn can satisfy user's demand continually.

Figure 4B:
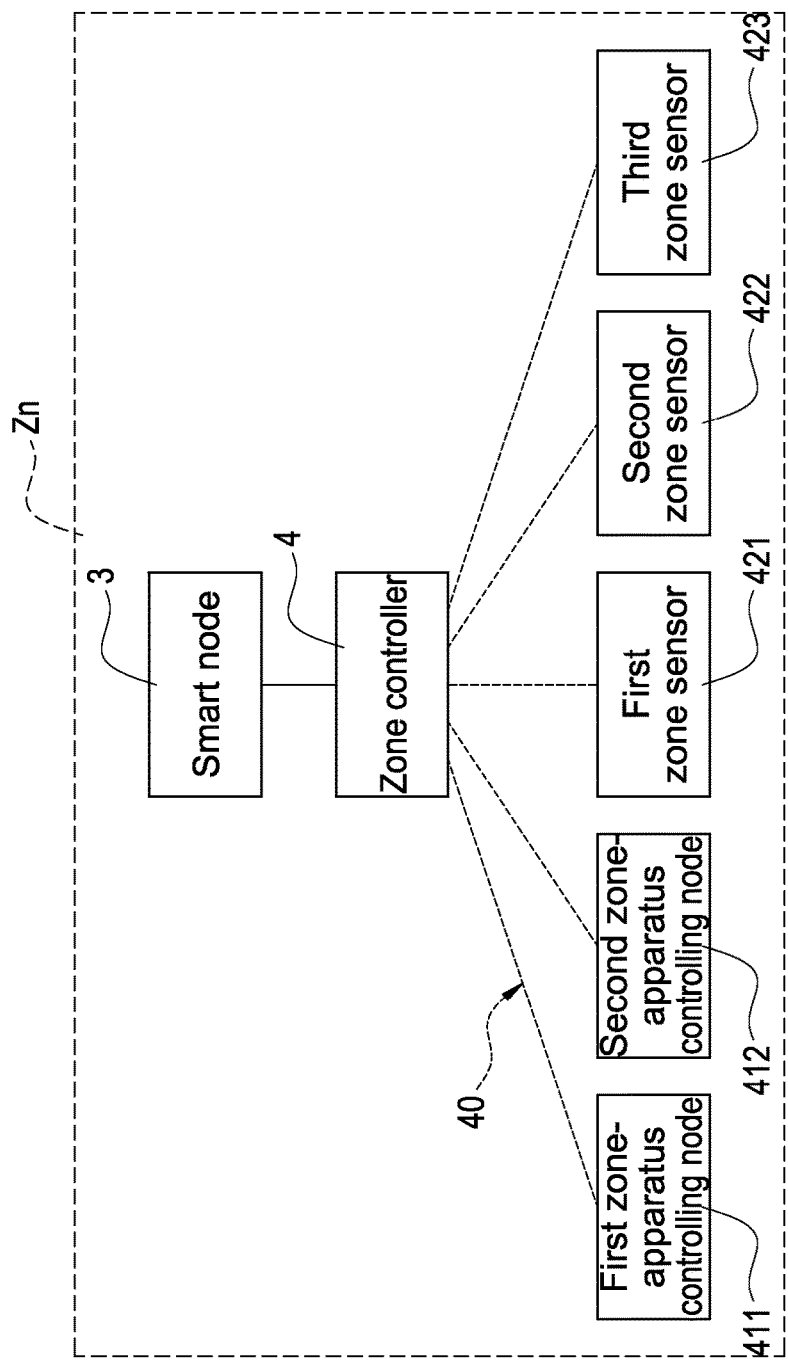
FIG. 4B is a schematic view of a specific zone of a second embodiment according to the present invention.

FIG. 4A shows a hierarchical construction of the system, however, in other embodiment, the construction of the SN 3, the ZC 4, the zone-apparatus controlling node and the zone sensor can be a horizontal construction. FIG. 4B is a schematic view of a specific zone of a second embodiment according to the present invention. In the embodiment, the SN 3, the ZC 4, the first zone-apparatus controlling node 411, the second zone-apparatus controlling node 412, the first zone sensor 421, the second zone sensor 422 and the third zone sensor 423 are arranged in the specific zone Zn.

The difference between the embodiment of the FIG. 4A and that of the FIG. 4B is that the ZC 4 in FIG. 4B connects with the first zone-apparatus controlling node 411, the second zone-apparatus controlling node 412, the first zone sensor 421, the second zone sensor 422 and the third zone sensor 423 through the local zone wireless sensing network 40 directly and simultaneously. In this embodiment, the ZC 4 extracts the aboved mentioned controlling actions from the first zone-apparatus controlling node 411 and the second zone-apparatus controlling node 412, and extracts the sensed information directly from the first zone sensor 421, the second zone sensor 422 and the third zone sensor 423.

In other words, the hierarchy of the zone-apparatus controlling nodes and the zone sensors in this embodiment are the same. If the zone-apparatus controlling node wants to request the information sensed by the zone sensor, it should requests the ZC 4 at first, and then obtain the requested information through the ZC 4, it is to say, the zone-apparatus controlling node in this embodiment cannot request the zone sensor for the sensed information directly.

Figure 5:
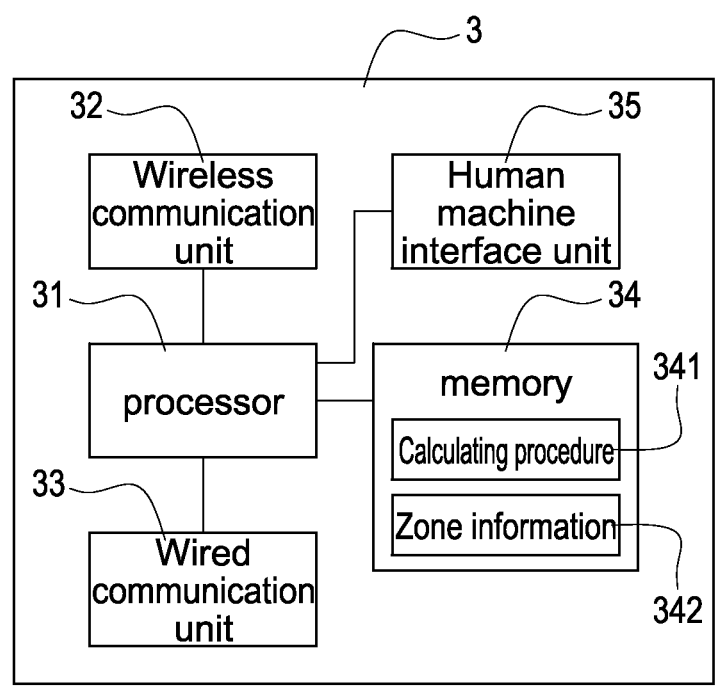
FIG. 5 is a block diagram of a smart node of a first embodiment according to the present invention.

FIG. 5 is a block diagram of a smart node of a first embodiment according to the present invention. As shown in FIG. 5, the SN 3 (and the routing SN 3') comprises a processor 31, a wireless communication unit 32, a wired communication unit 33 and a memory 34, wherein the processor 31 is electrically connected with the wireless communication unit 32, the wired communication unit 33 and the memory 34. The wireless communication unit 32 connects to the inter-zone wireless communication network 6 wirelessly, and communicates with other SNs 3 and/or the routing SN 3' through the inter-zone wireless communication network 6. The wired communication unit 33 connects with the ZC 4 in the arrangement zone electrically through a wired manner. In this embodiment, the wired communication unit 33 is a RS-485 connection port, but not limited thereto. If the SN 3 is the routing SN 3', then the SN 3' communicates with the gateway 5 through the wireless communication unit 32 or the wired communication unit 33.

The processor 31 executes analyses and necessary calculations based on the information obtained from the ZC 4. Also, the processor 31 processes the request received from the destination node, and triggers the ZC 4 to execute a control action corresponding to the request. The memory 34 at least stores a calculating procedure 341 which is used to execute the above analyses and calculations. In particularly, the calculating procedure 341 is an algorithm for executing the optimized control, and is stored in the memory 34 in advance before the SN 3 is arranged.

The SN 3 can further comprises a human machine interface (HMI) unit 35, the HMI unit 35 is electrically connected to the processor 31 and comprises an input module and a display module (not shown). The SN 3 receives information and/or demands inputted by the user through the input module, and displays information according to the user demand through the display module. In this embodiment, the display module only displays information related to the arrangement zone where the SN 3 is arranged, but does not display information related to other zones of other floors.

Figure 6:
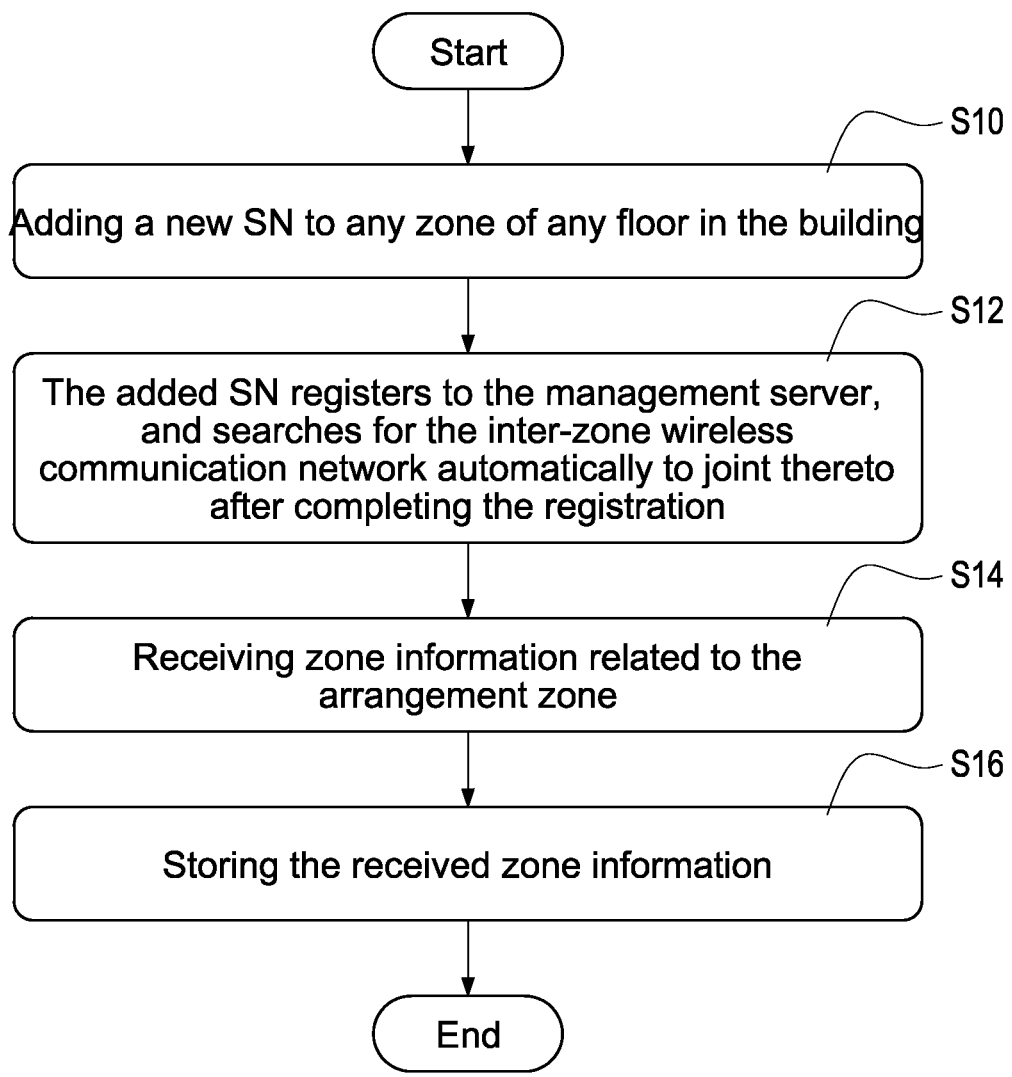
FIG. 6 is a flowchart for adding a smart node of a first embodiment according to the present invention.

FIG. 6 is a flowchart for adding a smart node of a first embodiment according to the present invention. The system in the present invention can add a new SN 3 to any zone of any floor in the building (step S10). After being turned on, the added SN 3 registers itself to the management server 52, and searches for the inter-zone wireless communication network 6 automatically to joint thereto after completing the registration (step S12). After the step S12, the SN 3 receives zone information 342 (as shown in FIG. 5) related to the arrangement zone where the SN 3 is arranged through the inter-zone wireless communication network 6 (step S14), and the SN 3 can further store the received zone information 342 (step S16).

In particularly, each zone of the building has different equipment abilities respectively according to the basic construction of the building, for example, some of the multi-zones of the building have a gap of a fan, a cooling sluice of a cooling pipe of an air conditioner system, an escape exit, etc. However, some of the multi-zones lack the above equipment abilities. In this embodiment, whenever the SN 3 is arranged completely, the SN 3 can receive and store the zone information 342 related to the arrangement zone where the SN 3 is arranged, and the zone information 342 records the above mentioned equipment abilities.

The database server 53 mentioned above stores the information according to the multi-zones of the multiple floors of the building, and also stores the basic data about the building, so the zone information 342 in this embodiment can be provided to the SN 3 by the database server 53. In other embodiment, the zone information 342 can also be provided to the SN 3 by other SNs 3 or the routing SNs 3', not limited thereto. By way of the zone information 342, the SN 3 can realize the equipment abilities of the arrangement zone, such as: (1) with or without the gap of the fan, and the amount of the arranged gap; (2) with or without the cooling sluice, and the amount of the arranged cooling sluice; (3) with or without the escape exit; (4) the distances between the arrangement zone and other zones.

As shown above, the plurality of SNs 3 in the system is arranged in different zones respectively, and each of the plurality of SNs 3 stores the equipment abilities of the zone where the SN 3 is arranged. Therefore, the system in the present invention can use the plurality of SNs 3 to indicate a plurality of equipment targets arranged in the building, and help the system to generate graphics to represent area topology networks according to the plurality of equipment targets respectively (as shown in the following).

Figure 7:
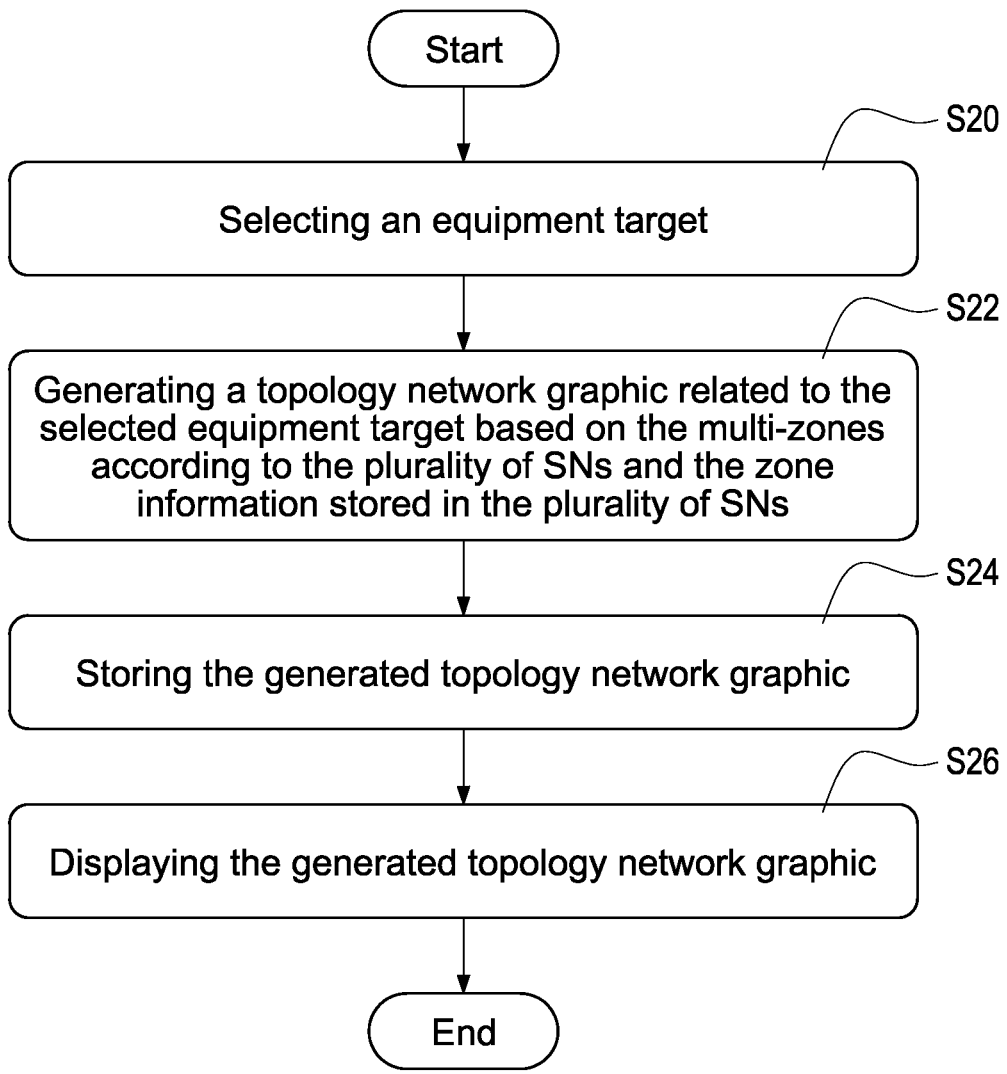
FIG. 7 is a flowchart for generating a topology network graphic of a first embodiment according to the present invention.

FIG. 7 is a flowchart for generating a topology network graphic of a first embodiment according to the present invention. Firstly, the system in the present invention selects any one of the plurality of equipment targets (step S20), for example, the fan or the cooling pipe mentioned above. Secondly, the system generates a topology network graphic (as shown in FIG. 10) related to the selected equipment target based on the multi-zones according to the plurality of SNs 3 and the zone information 342 stored in the plurality of SNs 3 (step S22).

After the step S22, the system stores the generated topology network graphic (step S24). In this embodiment, the step S22 and the step S24 mentioned above can be executed by each of the plurality of SNs 3, each of the plurality of routing SNs 3' or the management server 52, but not limited thereto.

Furthermore, if the management server 52 comprises a display monitor, the system can further display the generated topology network graphic through the display monitor of the management server 52 (step S26). Besides, a manager can operate a client terminal 54 (as shown in FIG. 3) to connect to the system (basically connects to the management server 52 or the routing SN 3'), and use the client terminal 54 to inquiry the topology network graphic.

Figure 8:
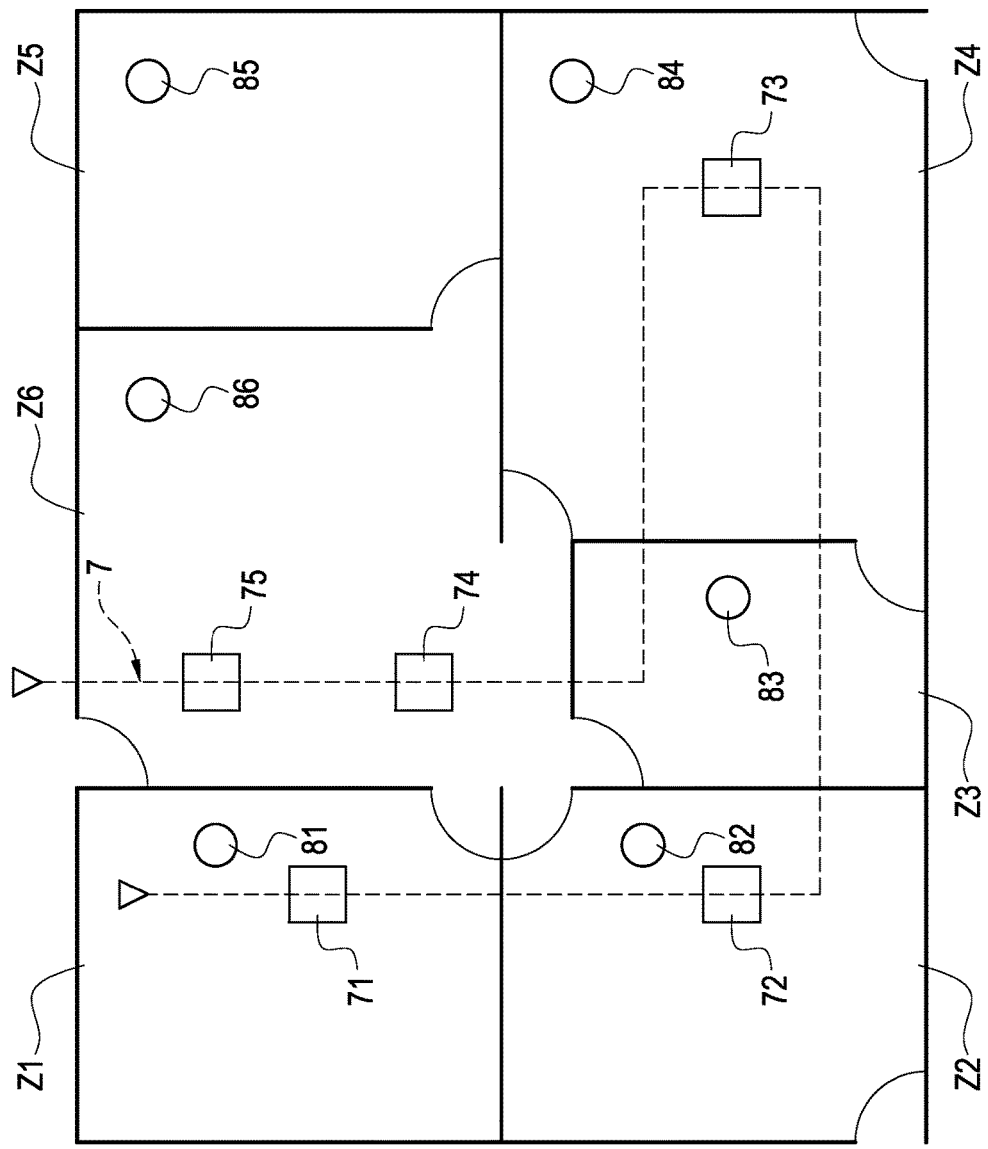
FIG. 8 is a schematic view of a pipe distribution in a floor of a first embodiment according to the present invention.
Figure 9:
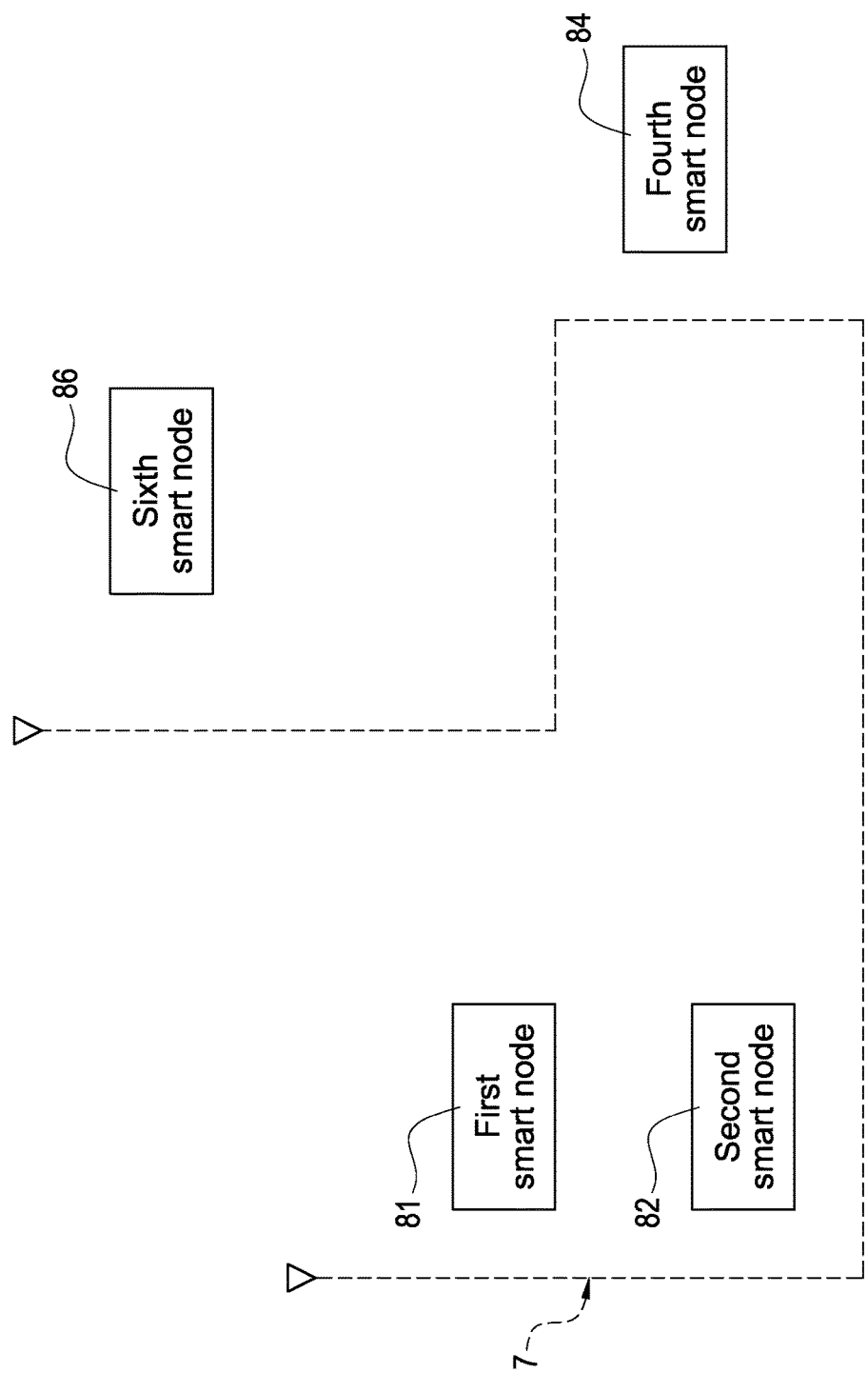
FIG. 9 is a schematic view of a topology network graphic of a first embodiment according to the present invention.
Figure 10:
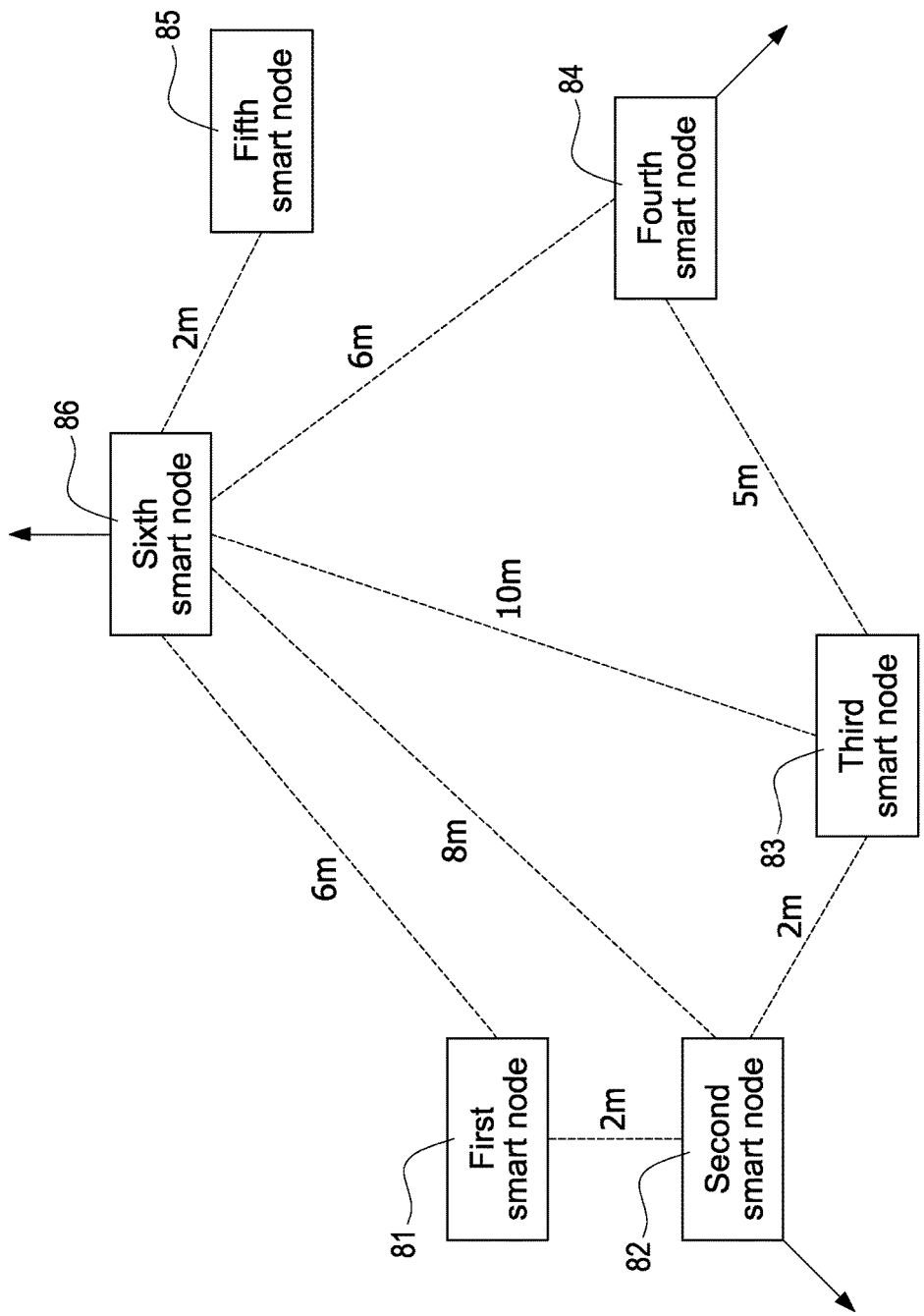
FIG. 10 is a schematic view of a topology network graphic of a second embodiment according to the present invention.

Referring to FIG. 8 to FIG. 10, FIG. 8 is a schematic view of a pipe distribution in a floor of a first embodiment according to the present invention, FIG. 9 is a schematic view of a topology network graphic of a first embodiment according to the present invention, FIG. 10 is a schematic view of a topology network graphic of a second embodiment according to the present invention.

FIG. 8 shows a plan for a single floor, however, the area topology described in the present invention can cross the multi-zones of the multiple floors, not limited to a single floor. The floor shown in FIG. 8 comprises a first zone Z1, a second zone Z2, a third zone Z3, a fourth zone Z4, a fifth zone Z5, and a sixth zone Z6. In this embodiment, a first SN 81 is arranged in the first zone Z1, a second SN 82 is arranged in the second zone Z2, a third SN 83 is arranged in the third zone Z3, a fourth SN 84 is arranged in the fourth zone Z4, a fifth SN 85 is arranged in the fifth zone Z5, a sixth SN 86 is arranged in the sixth zone Z6.

The dotted line in the FIG. 8 indicates a route of a cooling pipe 7 distributed for the air conditioner system. As shown in FIG. 8, the cooling pipe 7 comprises five cooling sluices arranged on this floor, wherein a first cooling sluice 71 is arranged in the first zone Z1, a second cooling sluice 72 is arranged in the second zone Z2, a third cooling sluice 73 is arranged in the fourth zone Z4, a fourth cooling sluice 74 and a fifth cooling sluice 75 are arranged together in the sixth zone Z6. In this embodiment, the cooling pipe 7 do not pass through the fifth zone Z5, and the cooling pipe 7 passes through the third zone Z3 but do not provide any cooling sluice in the third zone Z3.

If the system wants to use the plurality of SNs 81 to 86 to represent the area topology network of the cooling pipe 7, it can generate the topology network graphic as shown in FIG. 9 by way of the plurality of SNs 81 to 86. FIG. 9 shows the first SN 81, the second SN 82, the fourth SN 84, the sixth SN 86, and the route of the cooling pipe 7, it means that the first zone Z1, the second zone Z2, the fourth zone Z4 and the sixth zone Z6 are provided with at least one cooling sluices 71 to 75 respectively. In other words, the first zone Z1, the second zone Z2, the fourth zone Z4 and the sixth zone Z6 have the equipment ability to control the cooling sluices 71 to 75 to turn on/turn off. On the contrary, the third zone Z3 and the fifth zone Z5 do not have this equipment ability.

The topology network graphic in FIG. 9 shows the relative positions of each of the cooling sluices 71 to 75 by way of the SNs 81, 82, 84, and 86. It should be mentioned that the sixth zone Z6 has a large space and comprises both the fourth cooling sluice 74 and the fifth cooling sluice 75 therein, but the system in this embodiment only uses the sixth SN 86 to represent both of the fourth cooling sluice 74 and the fifth cooling sluice 75 at the same time. By way of the topology network graphic shown in FIG. 9, the manager can easily realize the area topology network of the cooling pipe 7 in this floor. Also, the management server 52 can refer to the topology network graphic when executing the optimized control for adjusting the temperature/humidity of the multi-zones in this floor. For example, if the management server 52 wants to adjust the amount of the cooling water flowing through this floor to raise/reduce the temperature, the management server 52 can ignore the third zone Z3 and the fifth zone Z5.

FIG. 10 shows a topology network graphic described an escape route of the floor. As shown in FIG. 10, the system uses the multiple SNs 81-86 to represent the multi-zones Z1-Z6 respectively, and indicates the distances between each zone and the position of the one or more escape exits on the topology network graphic. In this embodiment, the escape exits are arranged at the second zone Z2 (represented by the second SN 82), the fourth zone Z4 (represented by the fourth SN 84), and the sixth zone Z6 (represented by the sixth SN 86). However, the first zone Z1 (represent by the first SN 81), the third zone Z3 (represent by the third SN 83), and the fifth zone Z5 (represented by the fifth SN 85) do not have the equipment ability of the escape exit.

The manager of the system can easily realize the escape route of this floor by referring to the topology network graphic shown in FIG. 10. Also, the management server 52 can calculate the best escape routes for each zone of this floor by referring to this topology network graphic. For example, the management server 52 can calculate different escape directions and escape routes for people in different zones respectively based on the number of people in each zone and the distances between each zone. In this embodiment, the above calculation of the management server 52 can also be executed by the routing SN 3', not intended to limit the scope of the present invention.

It should be mentioned that the multiple SNs 81-86 can also execute local calculations respectively. In particularly, each of the multiple SNs 81-86 can real-time adjust the number of people in the arrangement zone, and provide an advance escape route for people in the arrangement zone directly. For example, the first zone Z1, the second zone Z2, and the sixth zone Z6 are interlinked in this embodiment, so the first SN 81 may suggests people in the first zone Z1 to escape from the first zone Z1 to the second zone Z2 or to the sixth zone Z6 based on the number of people in the first zone Z1, the second zone Z2, and the sixth zone Z6, and also based on the distance between the first zone Z1 and the second zone Z2, and the distance between the first zone Z1 and the sixth zone Z6.

The purpose of using the multiple SNs 81-86 to realtime adjust the number of people and provide escape routes respectively is to provide optimized partial escape routes continually based on the information of each of the multi-zones through each of the multiple SNs 81-86. For example, if a fire causes the management server 52, the routing SN 3', or anyone of the multiple SNs 81-86 to be broken, or disconnects the links between the management server 52, the routing SN 3', or the multiple SNs 81-86, the system in the present invention can still work and provide optimized partial escape routes through normal SN. Therefore, people can still obtain the escape routes in any situation.

The present invention uses the cooling pipe in FIG. 9 and the escape route in FIG. 10 to show examples, however, the system can use the multiple SNs 3 to indicate any equipment in the building via above mentioned method, and generate above mentioned topology network graphics. Therefore, the system is more convenient to be inquired by the manager, and the system can execute the optimized control easily.

By way of the topology network graphics, multiple SNs 3 on same floor can execute parallel calculation simultaneously when an event occurs. The multiple SNs 3 then transmit calculated results to the routing SN 3' or the management server 52, and the routing SN 3' or the management server 52 can execute a total calculation for the whole building. In this embodiment, the system can not only execute the optimized control for each zone respectively, but also use the multiple SNs 3 to accomplish the parallel calculation to raise calculation time and reduce loading of the management server 52.

Figure 11:
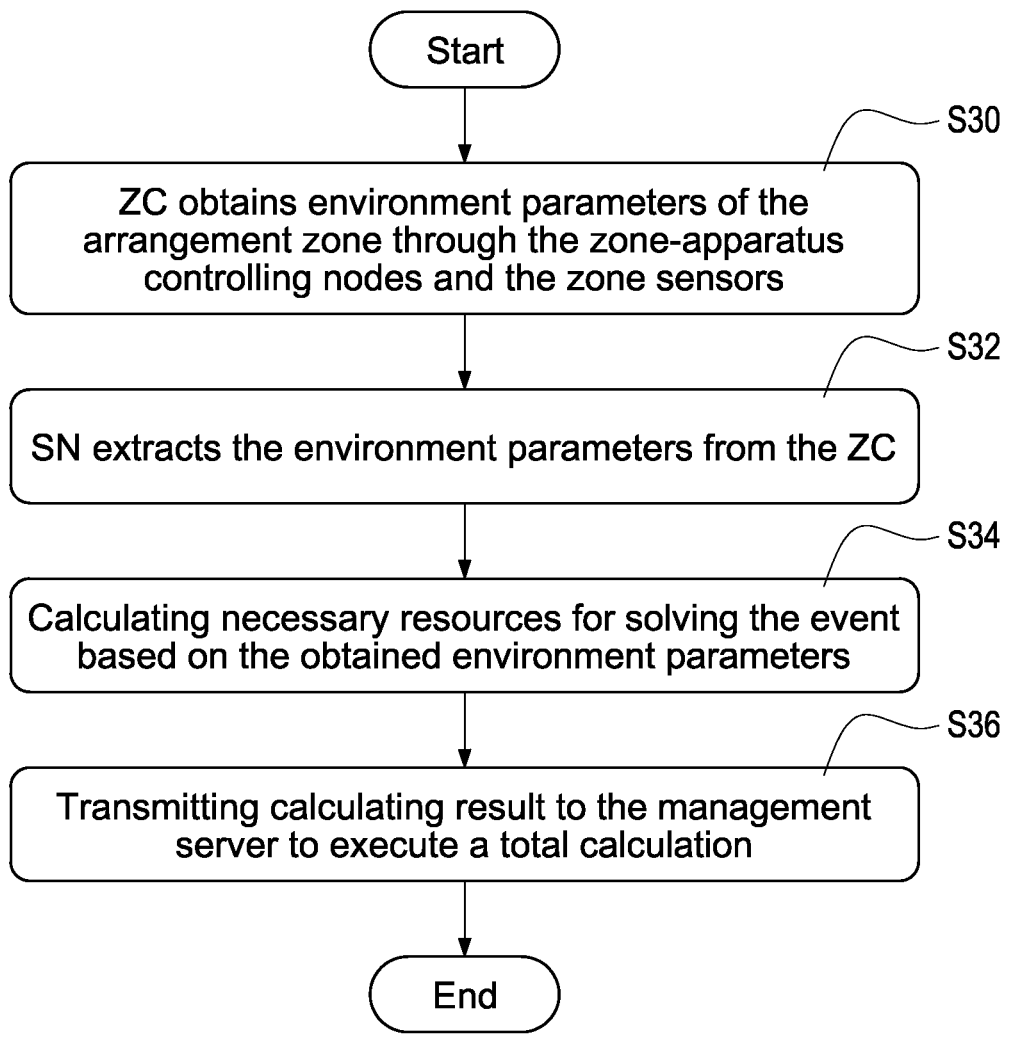
FIG. 11 is a flowchart for event management of a first embodiment according to the present invention.

FIG. 11 is a flowchart for event management of a first embodiment according to the present invention. When an event occurs (for example, the user requests to adjust indoor temperature), each of the plurality of ZCs 4 obtains environment parameters of the arrangement zone respectively through the zone-apparatus controlling nodes and the zone sensors in the arrangement zone (step S30). The environment parameters in this embodiment is, for example, number of people, temperature, humidity, $CO_2$ value, etc. After the step S30, the SN 3 extracts the above mentioned environment parameters from the ZC 4 (step S32), and the SN 3 then calculates necessary resources for solving the event based on the obtained environment parameters (step S34). In particularly, the SN 3 in the step S34 mainly calculates the necessary resources for adjusting the environment of the arrangement zone to satisfy the request of the user for environment comfort.

For example, the ZC 4 obtains the environment parameters (such as the number of people, the temperature and the humidity) of the arrangement zone through the zone-apparatus controlling nodes and the zone sensors. The SN 3 in the arrangement zone extracts the environment parameters from the ZC 4, executes the calculation procedure 341 based on the extracted environment parameters, and calculates the heat value generated per second in the arrangement zone. Next, the SN 3 can calculate the amount of cooling water flowing through the arrangement zone per second by the cooling pipe 7, where the cooling water is needed to adjust the environment of the arrangement zone to satisfy the request of the user for environment comfort.

Finally, each of the multiple SNs 3 respectively transmit the calculating result (such as the amount of the cooling water) to the management server 52, and the management server 52 executes the total calculation based on the received calculating results (step S36), i.e., the management server 52 calculates the necessary resources for adjusting the environment of all zones simultaneously to satisfy the request of the user for environment comfort. For example, the management server 52 receives the calculating results from each SN 3 of each floor, and calculates the amount and the temperature of the cooling water needed to flow through each floor via the cooling pipe 7 for making the environment of each zone of each floor to satisfy the request of the user for the environment comfort at the same time.

It should be mentioned that each of the multiple SNs 3 firstly transmits the calculating result to the routing SN 3', and the routing SN 3' transmits the receives calculating result to the management server 52 through the gateway 5. In this embodiment, the routing SN 3' can execute the total calculation directly for the multi-zones of the arrangement floor, so as to calculate the amount and the temperature of the cooling water needed to flow through the multi-zones of the arrangement floor via the cooling pipe 7 for making the environment of the multiple zones of the arrangement floor to satisfy the request of the user for the environment comfort at the same time.

For communicating with the multiple SNs 3 of the multi-zones, one or more enormous equipments (for example, the cooling host of the air conditioner system) of the building can be provided with one of the SN 3, and the enormous equipments can connect with the multiple SNs 3 of the multi-zones through the routing SN 3'.

In particularly, the SNs arranged in the multi-zones are used to execute data analyses, calculations and transmissions, and are used to be a first-type smart node. The SN arranged in/with the enormous equipments is used to receive requests from the routing SN 3', and control the enormous equipments based on the received requests, and is used to be a second-type smart node.

Figure 12:
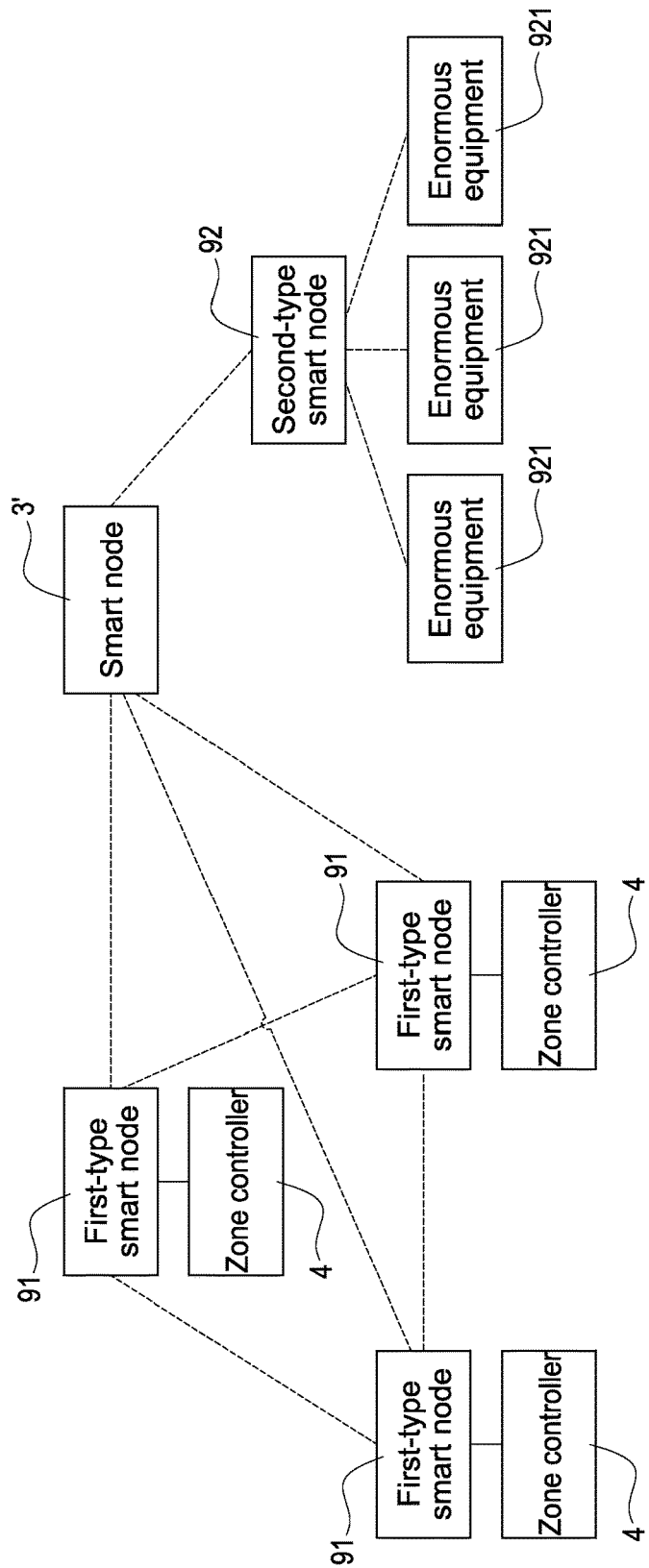
FIG. 12 is a schematic view of a wireless management and communication system of a fourth embodiment according to the present invention.

FIG. 12 is a schematic view of a wireless management and communication system of a fourth embodiment according to the present invention. Each of the multi-zones is arranged with a first-type SN 91 respectively, and each of the multiple first-type SNs 91 is electrically connected to the ZC 4 of the same arrangement zone, and connected to the routing SN 3' wirelessly. The first-type SN 91 extracts information from the connected ZC 4 of the arrangement zone to execute the analyses and calculations, and obtains the resource needed for the arrangement zone to adjust the environment to satisfy the request of the user based on analyzing result and calculating result. Also, the first-type SN 91 transmits the analyzing result and the calculating result to the routing SN 3', and the routing SN 3' transmits the result to other first-type SN 91 of other zone.

A second-type SN 92 connects with all routing SNs 3' in the building simultaneously, and the second-type SN 92 also connects with an enormous equipment 921 of the building. In particularly, the second-type SN 92 basically connects with one or more enormous (large sized) equipment 921 with same type, but an amount of the enormous equipment 921 is not limited. For example, there are three enormous equipments 921 shown in FIG. 12, and the three enormous equipments 921 are the same type.

The second-type SN 92 receives the resources needed by each zone from the routing SN 3', and controls the enormous equipments 921 to execute a corresponding action based on the received resources. For instance of the cooling water, each of the three enormous equipments 921 can be the cooling host of the air conditioner system. If the second-type SN 92 in this embodiment connects to three cooling hosts at the same time, the second-type SN 92 can determine how to control the three cooling hosts respectively to make the total amount of the cooling water can satisfy all requests needed by the multi-zones after calculating.

The present invention uses the SNs and the ZCs of the multi-zones to accomplish zone optimizations, so as to solve the problem the traditional building controlling system lacks of resilience. Further, the present invention uses the SNs of the multi-zones to indicate the equipment abilities of the multi-zones, so as to represent the area topology networks of the equipment targets in the building. Therefore, the present invention can help the manager to manage the system and help the system to execute the optimized control.

As the skilled person will appreciate, various changes and modifications can be made to the described embodiment. It is intended to include all such variations, modifications and equivalents which fall within the scope of the present invention, as defined in the accompanying claims.

What is claimed is:

1. A wireless management and communication network system applied in a building having multi-zones, the system comprising:
   a plurality of zone controllers (ZCs) respectively arranged in the multi-zones of the building, each arrangement zone of the multi-zones respectively arranged with one of the ZCs, each ZC wirelessly connected to at least one zone apparatus in a same arrangement zone to control the zone apparatus and receive feedback information from the zone apparatus; and
   a plurality of smart nodes (SNs) respectively arranged in the multi-zones of the building and a number of the plurality of SNs is equal to a number of the plurality of ZCs, each arrangement zone of the multi-zones respectively arranged with one of the SNs, each SN electrically connected to the ZC arranged in the same arrangement zone to extract the information of the zone apparatus in the same arrangement zone from the ZC, and calculating resources needed for adjusting the environment of the arrangement zone to satisfy a request of a user for environment comfort based on the information, so as to respectively perform an optimized control for the environment of each arrangement zone by each SN arranged therein;

wherein,
the plurality of SNs connect with each other wirelessly and transmit the information of the multi-zones between the SNs,
each ZC connects with the zone apparatus in the same arrangement zone respectively through a local zone wireless sensing network, and
at least one SN of the plurality of SNs is a routing SN capable of router function, the routing SN receives calculation results from the SNs through the inter-zone wireless communication network, and executes a total calculation to obtain the resources needed for adjusting the environment of the multi-zones to satisfy the request of the user for the environment comfort based on the received calculation results.

2. The wireless management and communication network system according to claim 1, wherein the plurality of SNs connect with each other through an inter-zone wireless communication network.

3. The wireless management and communication network system according to claim 2, wherein the local zone wireless sensing network is a Zigbee communication network, the inter-zone wireless communication network is a wireless mesh network (WMN).

4. The wireless management and communication network system according to claim 1, further comprises a second-type SN connected to the SN equipped with router function and a specific equipment of the building wirelessly, wherein the second-type SN receives the resources needed by each arrangement zone through the routing SN, and controls the specific equipment to execute a corresponding action based on the received resources.

5. The wireless management and communication network system according to claim 1, further comprises:
a gateway connected to the routing SN;
a bus electrically connected to the gateway;
a database server electrically connected to the bus, wherein the database server stores the information according to the multi-zones, and stores basic data of the building, construction information according to multiple floors of the building and configuration position information according to a plurality of hardware equipment of the building; and
a management server electrically connected to the bus, wherein the management server extracts the information from the database server to execute analyses and calculations to perform an optimized control for the environment of the building.

6. The wireless management and communication network system according to claim 2, further comprises a zone-apparatus controlling node and a zone sensor arranged in each arrangement zone, wherein the zone sensor senses environment parameters in the arrangement zone, the zone-apparatus controlling node is connected to the zone apparatus in the same arrangement zone and executes a controlling action to the zone apparatus according to the environment parameter, wherein the ZC in the same arrangement zone is connected to the zone-apparatus controlling node and extracts the environment parameters and the controlling action from the zone-apparatus controlling node, and the SN in the same arrangement zone extracts the environment parameters and the controlling action from the connected ZC.

7. The wireless management and communication network system according to claim 2, wherein each SN stores zone information related to the arrangement zone respectively, and each zone information records equipment abilities of an equipment target of the arrangement zone respectively.

8. The wireless management and communication network system according to claim 7, wherein a topology network graphic is generated by the system based on the multi-zones according to the SNs and the zone information stored in the SNs, and the topology network graphic records an area topology network according to the equipment target, and the topology network graphic uses the SNs therein to indicate the equipment abilities related to the equipment target of the multi-zones.

9. The wireless management and communication network system according to claim 8, wherein the equipment target comprises a wind gap of a fan, a cooling sluice of a cooling pipe of an air conditioner system or an escape exit.

10. A wireless management and communication network system applied in a building, the building constructed by a plurality of floors, each floor constructed by multi-zones, the system comprising:
a plurality of zone controllers (ZCs) arranged in the multi-zones respectively, each arrangement zone of the multi-zones respectively arranged with one of the ZCs, each ZC wirelessly connected to a zone apparatus in a same arrangement zone respectively through a local zone wireless sensing network to control the connected zone apparatus and receive feedback information from the zone apparatus;
a plurality of smart nodes (SNs) arranged in the multi-zones respectively and a number of the plurality of SNs is equal to a number of the plurality of ZCs, each arrangement zone of the multi-zones respectively arranged with one of the SNs, each SN electrically connected to the ZC arranged in the same arrangement zone to extract the information of the zone apparatus in the same arrangement zone from the ZC to execute analyses and calculations, and executing an optimized control for the environment of the arrangement zone respectively based on analyzing result and calculating result; and
a plurality of routering SNs arranged on the plurality of floors respectively, each arrangement floor of the plurality of floors respectively arranged with one of the routering SNs, each routering SN connected with the plurality of SNs on a same arrangement floor wirelessly through an inter-zone wireless communication network and receiving the information according to the multi-zones of the same arrangement floor from the plurality of SNs, and executing an optimized control simultaneously for the environment of all the multi-zones of the arrangement floor by each routering SN respectively,
wherein
each SN calculates resources needed for adjusting the environment of the arrangement zone to satisfy a request of a user for environment comfort respectively, and
at least one routering SN of the plurality of routering SNs receives calculation results from the SNs through the inter-zone wireless communication network, and executes a total calculation to obtain the resources needed for adjusting the environment of the multi-zones to satisfy the request of the user for the environment comfort based on the received calculation results.

11. The wireless management and communication network system according to claim 10, wherein each ZC receives environment parameters of the arrangement zone respectively to provide to the SN in the same arrangement zone.

12. The wireless management and communication network system according to claim 11, wherein each of the plurality of SNs comprises a memory respectively, each of the plurality of memories stores zone information related to the arrangement zone respectively, and each of the zone information records equipment abilities of a plurality of equipment targets of the arrangement zone respectively.

13. The wireless management and communication network system according to claim 12, wherein the system further comprises a management server connected to the plurality of routing SNs, and connected to the plurality of SNs through the plurality of routing SNs, wherein the management server generates topology network graphics based on the multi-zones according to the plurality of SNs and the zone information stored in the plurality of SNs, and each topology network graphic records an area topology network according to one of the plurality of equipment targets respectively, and the plurality of topology network graphics use the plurality of SNs therein to indicate the equipment abilities related to the plurality of equipment targets of the multi-zones.

* * * * *